United States Patent [19]
Petisce

[11] Patent Number: 5,314,519
[45] Date of Patent: May 24, 1994

[54] METHODS AND APPARATUS FOR INCREASING OPTICAL FIBER DRAW SPEED

[75] Inventor: James R. Petisce, Norcross, Ga.

[73] Assignee: AT&T Bell Laboratories, Murray Hill, N.J.

[21] Appl. No.: 938,076

[22] Filed: Aug. 31, 1992

[51] Int. Cl.$^5$ .......................................... C03B 37/023
[52] U.S. Cl. ...................... 65/3.11; 65/3.43; 65/13; 65/11.1; 427/457; 427/461; 427/508
[58] Field of Search ............... 65/3, 11, 3.43, 13, 65/11.1; 427/457, 461, 508

[56] References Cited

U.S. PATENT DOCUMENTS

| | | | |
|---|---|---|---|
| 4,125,644 | 11/1978 | Ketley et al. | 65/3.43 X |
| 4,932,750 | 6/1990 | Ansel | 427/54.1 |
| 5,000,772 | 3/1991 | Petisce | 65/3.11 |
| 5,021,072 | 6/1991 | Atkins et al. | 65/3.11 |

FOREIGN PATENT DOCUMENTS

| | | | |
|---|---|---|---|
| 341697 | 11/1989 | European Pat. Off. | 427/47 |
| 1467072 | 3/1989 | U.S.S.R. | 427/47 |

OTHER PUBLICATIONS

Schlef; Conference: Proceedings of the 28th International Wire and Cable Symposium, Cherry Hill; Nov. 13-15, 1979; UV Cured Resin Coating For Optical Fiber/Cable; C. L. Shlef, P. L. Narasimham, S. M. Oh; pp. 327-332.

Primary Examiner—Robert L. Lindsay
Attorney, Agent, or Firm—Donald E. Hayes, Jr.; Edward W. Somers

[57] ABSTRACT

Short and long wavelength absorption losses contribute to loss at the operating wavelength of an optical fiber drawn from a preform. Excess losses over and above Rayleigh scattering losses have been attributed to conditions such as temperature and the speed during drawing. Typically, after optical fiber (21) is drawn from an optical preform in a furnace (23) wherein temperatures may be 2200° C. or higher, the fiber is moved out of the furnace and immediately through ambient environment to other portions of a draw line such as, for example, measuring and coating apparatus. It has been found that these absorption losses may be reduced substantially by application of a magnetic field to the optical fiber after it has been drawn and prior to it being coated.

12 Claims, 2 Drawing Sheets

METHODS AND APPARATUS FOR INCREASING OPTICAL FIBER DRAW SPEED

TECHNICAL FIELD

This invention relates to methods and apparatus for increasing optical fiber draw speed. More particularly, this invention relates to methods of and apparatus for increasing the manufacturing line speed at which optical fiber is drawn from a preform and causing the optical fiber to have a relatively low absorption loss.

BACKGROUND OF THE INVENTION

Optical communications systems, that is systems operating in the visible or near visible spectra, are now at an advanced state of development. Such systems utilize glass fibers as the transmission medium. These fibers, generally having an overall cross-sectional diameter of about 125 $\mu$m, are generally composed of at least two portions, a central core and a cladding layer disposed about the core. The cladding layer has an index of refraction which is less than that of the core, with a typical index variation from the core to the cladding layer being in the range from about 0.01 to 0.05. Optical fibers in use may be single-mode or multimode. The former is characterized by a sufficiently small core to accommodate efficiently only the first order mode. Such single-mode optical structures may have a core diameter of about 8 $\mu$m. Multimode optical fibers typically have cores which have a diameter in the range of about 50 $\mu$m to 100 $\mu$m.

In the manufacture of optical fiber, a glass preform rod which generally is manufactured in a separate process is suspended vertically and moved into a furnace at a controlled rate. The preform rod softens in the furnace and optical fiber is drawn freely from a molten end of the preform rod by a capstan located at the base of a draw tower. Because the surface of the optical fiber is very susceptible to damage caused by abrasion, it becomes necessary to coat the optical fiber, after it is drawn, but before it comes into contact with any surface.

One of the most important parameters for an optical fiber is loss. Loss which is expressed in decibels per kilometer (dB/Km) can be caused by absorption of impurities in the glass, or by scattering of the light. Production optical fibers are made of glass which contains impurities, as well as compositional variations. Optical loss can be plotted as a function of the wavelength of light passing through the optical fiber. For silica fibers doped with germanium and/or phosphorus, there is a minimum loss at a wavelength of about 1.55 $\mu$m. The selection of doped silica glass takes advantage of the "window" between infrared molecular vibration absorption and Rayleigh scattering plus ultraviolet absorption regions or "tails".

Rayleigh scattering results from density and compositional variations within the fiber material. Rayleigh scattered energy is absorbed in the cladding and guided in a backward direction. During the processing of optical fiber, it is desired to reduce the impurity absorption loss to zero so that only the loss due to Rayleigh scattering remains. However, other forms of scatter loss may occur and impede the achievement of this goal. One is loss caused by variations in the size of the fiber core. Dimensional variations introduced into production fiber can cause loss by light scattering and influence the quality of a fiber connector or splice because of size differences.

Absorption results when light photons contain sufficient energy to excite electrons of the glass constituent materials. In transparent media of pure silica, the oxygen atoms have very tightly bound electrons and only ultraviolet light photons have enough energy to be absorbed. However, the silica in optical fiber includes dopants and transition-metal impurities whose electrons can be excited by lower energy light. Those constituents cause the ultraviolet absorption to be shifted lower and cause additional absorption bands in the visible and near infrared ranges. The amount of loss which is caused by the presence of these impurities depends on their concentration. At certain wavelengths, relatively small concentrations of impurities may cause an increase in absorption loss of about 1 dB/Km.

In addition to the problem of impurity absorption, another problem arises from the presence of the hydroxyl (OH$^-$) ion. The fundamental vibration of this ion occurs at a wavelength of 2.7 $\mu$m, but overtones at 0.95 and 1.4 $\mu$m extend to the priorly mentioned window region. Concentrations of OH$^-$ as low as one part per million can cause losses as high as 1 dB/Km at 0.95 $\mu$m and 50 dB/Km at 1.4 $\mu$m. Obviously, it is important to reduce these so-called water peaks to as low a value as possible to achieve the lowest loss in transmission windows around 1.3 $\mu$m and 1.55 $\mu$m.

Low loss silica-rich fibers are made by using silicon tetrachloride (SiCl$_4$) as a precursor material. This material typically is very low in transition-metal ion impurities, but may contain substantial amounts of hydrogen-bearing compounds. Because the glass for the fiber is formed in a process by reacting the SiCl$_4$ with oxygen, OH$^-$ can form readily if hydrogen is present. Hence, it is important not only to use precursor materials that are low in hydrogen content, but also to prevent entry of similar compositions into the process or inadvertent contamination by handling.

Optical fiber loss also has been found to depend on conditions during the drawing of the fiber from a preform such as, for example, the temperature of the preform during draw, and the speed at which the fiber is drawn. These last two mentioned conditions also determine the fiber tension during draw. During the drawing of the optical fiber, defects are generated and the number of defects is dependent on the drawing conditions which of course can cause changes in the loss. However, these defects seemingly are rendered benign if the preform from which the optical fiber is being drawn includes alkalies.

Although the presence of alkalies is helpful in rendering impotent those defects caused during drawing, another problem concerning absorption losses revolves around the use of precursor tubes, the composition of which includes relatively low levels, i.e. about 100 to 0.1 ppm atomic, of alkalies. It has been found that the long term hydrogen effect attributed to the presence of alkalies affects adversely the performance of the optical fiber drawn from a preform which has been manufactured from such a precursor tube. This problem becomes particularly acute when using a so-called rod and tube process in which a preform rod is overclad with a tube to provide a larger preform for draw. During the processing of a substrate tube which includes alkalies in a normal MCVD process, for example, the alkali level somehow is reduced. In the rod and tube process, which is today becoming very popular as a means to save costs, this does not occur and long term hydrogen-related absorption losses will increase.

Because of such adverse effects, efforts have been made to provide precursor quartz tubes which are substantially alkali-free. It has been found that absorption losses which have been somewhat troublesome in the past may increase substantially when using alkali-free precursor tubes.

What were needed were methods and apparatus which provide an optical fiber having relatively low drawing-induced absorption losses. A method of making an optical fiber having a relatively low absorption loss includes the step of moving an optical preform incrementally into a device in which the preform is exposed to heat energy and then drawing optical fiber from each successive portion of the preform as it is exposed to the heat energy. Then the temperature of the drawn fiber is caused to decrease in a controlled manner which causes the absorption loss of the drawn fiber to be relatively low. In a preferred embodiment, the temperature of the drawn optical fiber is caused to decrease gradually to avoid an abrupt change in that parameter which has been commonplace in the prior art. This may be accomplished, for example, by appending a recovery tube to a lower end of a draw furnace or by engaging the drawn optical fiber with a gas at a controlled temperature or both to anneal the drawn fiber in a controlled manner.

It should be apparent that the use of a recovery tube to anneal defects is line speed limited and that to achieve the best results, the line speed needs to be on the low end of the scale. This, of course, is counterproductive to recent efforts to increase line speed. Higher line speeds are achievable because of improved optical fiber coating techniques, but the annealing step remains line speed limiting.

What is sought after and seemingly what is not available in the prior art are methods and apparatus for annealing drawn optical fiber to reduce loss without limiting the speed at which the optical fiber is moved along a drawing line. Such sought after methods and apparatus should be capable of being integrated easily into existing optical fiber draw lines or towers as they commonly are called.

SUMMARY OF THE INVENTION

The foregoing problems of the prior art have been overcome by the methods and apparatus of this invention. A method of making an optical fiber which has a relatively low absorption loss, said method comprising the steps of exposing successive increments of length of a preform of heat energy which is sufficient to allow optical fiber to be drawn from the successive increments of length; drawing optical fiber from successive increments of length which are subjected to heat energy; and exposing the drawn coated fiber to a magnetic field to remove any defect sites, the exposure being effective at line speeds which are significantly increased over those used in the past.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
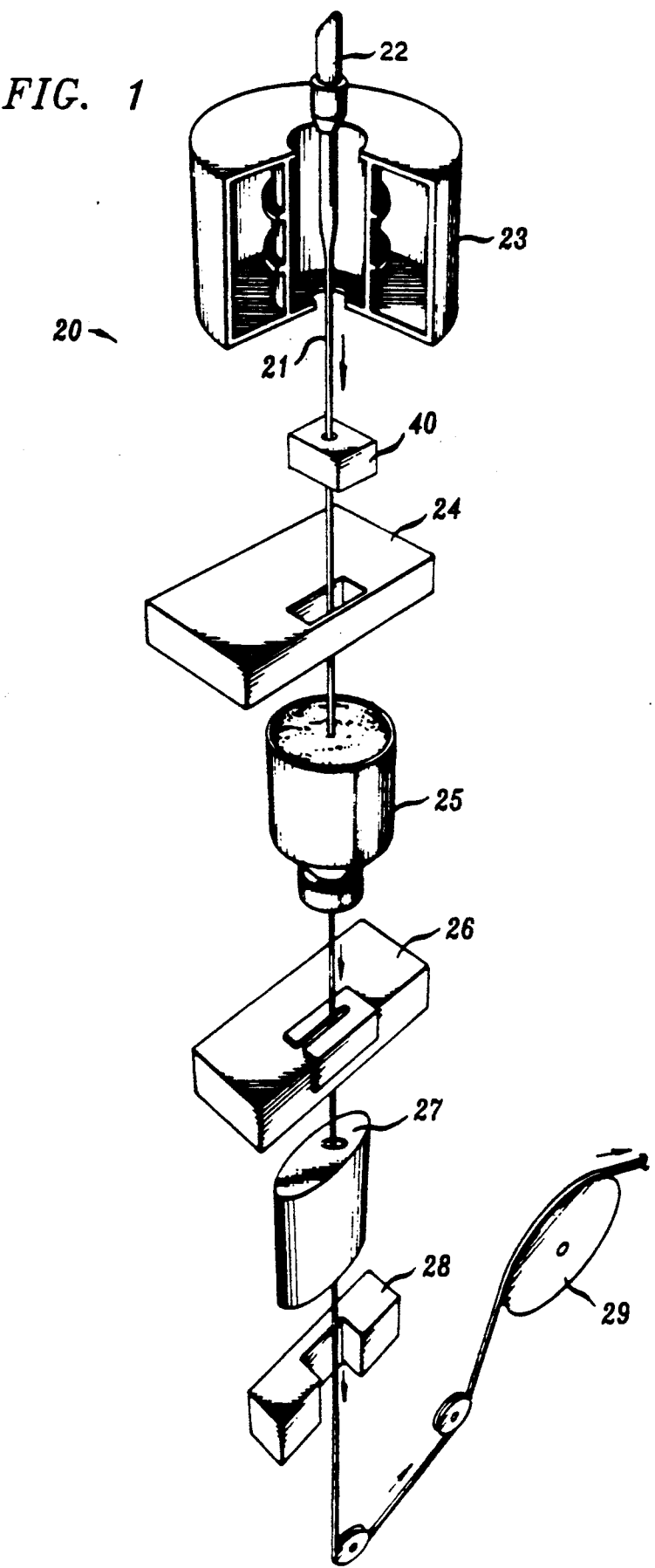
FIG. 1 is a perspective view of a manufacturing line on which optical fiber is drawn.

Referring now to FIG. 1, there is shown an apparatus which is designated generally by the numeral 20 and which is used to draw an optical fiber 21 from a specially prepared cylindrical preform 22 and then to coat the optical fiber. The optical fiber 21 is formed by locally and symmetrically heating the preform 22 which typically is about 22 mm in diameter and about 70 cm in length to a temperature in the range of about 2100°–2200° C. As the preform 22 is fed into and through a draw furnace 23, optical fiber 21 is drawn from the molten material.

As can be seen in FIG. 1, the draw apparatus includes the furnace 23, wherein the preform 22 is drawn down to the desired optical fiber size, and optical fiber 21 is pulled from the heat zone. The diameter of the optical fiber 21 which is measured by a device 24 at a point shortly after the furnace 23 becomes an input into a control system. Within the control system, the measured diameter is compared to the desired value and an output signal is generated to adjust the draw speed such that the fiber diameter approaches the desired value.

After the diameter of the optical fiber 21 is measured, a protective coating or coatings is applied by an apparatus 25. Then, after the coated optical fiber 21 is passed through a centering gauge 26, an ultraviolet (UV) device 27 for treating the coating material to cure the coating material and a device 28 for measuring the outer diameter of the coated fiber, it is moved through a capstan 29 and is taken up on a spool (not shown) for testing and storage prior to subsequent operations or sale. The preservation of the intrinsically high strength of optical fibers is important during the ribboning, jacketing, connectorization and cabling of the optical fibers and during their service lives.

Figure 2:
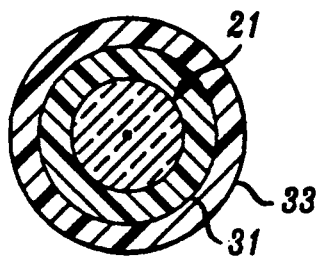
FIG. 2 is an end view in section of an optical fiber drawn and coated on the manufacturing line of FIG. 1.

The drawn, coated optical fiber is shown in FIG. 2 and includes the core and cladding. One or more layers of coating material are applied to the drawn fiber. In FIG. 2, there is shown an inner or primary layer 31 and an outer or secondary layer 33.

During the time when the optical fiber is being moved through the draw furnace, the fiber is being subjected to heat and tension. As a result, some of the bonds in the glass network are broken and rearranged. Different types of defects can be generated and cause both ultraviolet and infrared absorption losses. It has been found that these bonds may be reconnected by using the methods and apparatus of this invention.

Alkalies such as sodium and lithium which were known to be present in the precursor tubes that have been in general use come into play and terminate the broken bonds before the bonds can be reestablished. These elements are active at high temperatures so that during the drawing operation when temperatures of about 2200° C. are typical, they diffuse into the optical fiber core from the precursor tube. In the past then, when the precursor tubes were not alkali-free, alkali ions diffused into the fiber core and connected to those broken bonds to alter the defect formation caused during drawing. As a result, the number of active absorption sites were reduced. However, it has been found that the presence of alkali-ions in the drawn fiber increases hydrogen sensitivity and causes unacceptably high losses although only a small amount of hydrogen is present. Molecular hydrogen diffuses into the fiber from the cable or from the ambient environment and reacts with the alkali ion terminated sites to form permanent $OH^-$ bonds which cause these losses. This results in long wavelength, IR absorption losses. In other words, the broken bonds resulting from the drawing operation result in long term hydrogen induced absorption losses which are related to initial alkali levels present within the optical fiber.

In order to overcome this long term hydrogen effect, alkali-free precursor tubes have been sought after and used. Although this solved the long term hydrogen effect, there were no alkali ions to occupy the bonds broken during the drawing operation, and as a result, it has been found that absorption losses increased. The broken bonds resulting from the high temperatures during drawing of the optical fiber from the preform cause absorption losses. These may be referred to as defect-related losses.

It has been determined that such increased loss in alkali-free tubes is caused by the thermal shock encountered when the drawn fiber is moved out of the draw furnace into ambient atmosphere prior to it being coated. The thermal shock in effect freezes the defects and allows no recovery from the condition brought on by the relatively high temperature of the draw furnace. This problem has been overcome in the past by moving the drawn fiber through an annealing tube in which the decreasing temperature of the fiber was controlled, but this technique was speed limiting.

It has been previously shown that application of a magnetic field to an optical fiber coating material during irradiation can cause an increase in the polymerization rate. See U.S. Pat. No. 5,000,772 which issued on Mar. 19, 1991, in the name of J. R. Petisce and which is incorporated by reference hereinto. A mechanism which includes spin flip of a singlet radical pair formed by light absorption of a photoinitiator coating component has been proposed to explain this observed effect. Such a spin flip results in the formation of a triplet radical pair which is more likely to initiate free radical polymerization of the coating material.

Drawn optical fibers, analyzed by electron spin resonance (ESR) spectroscopy, have been shown to contain free radicals. It is postulated that these free radical defect sites are caused by broken chemical bonds resulting from the high temperature exposure during draw of the optical fiber from the preform. It can be deduced from the presence of free radical defect sites in drawn optical fiber that misalignment of electron spins during fiber draw must also be present. Because electron spin misalignment disfavors chemical bond formation, what is needed and what is provided for here is a method to alter the electron spin alignment of free radicals formed from the high temperature exposure during draw of the optical fiber from the preform by exposure of the fiber to a magnetic field during draw. Such alteration of the electron spin alignment during draw reduces or eliminates the amount of free radical defect sites present in drawn optical fiber which will reduce the associated added transmission loss.

Figure 3:
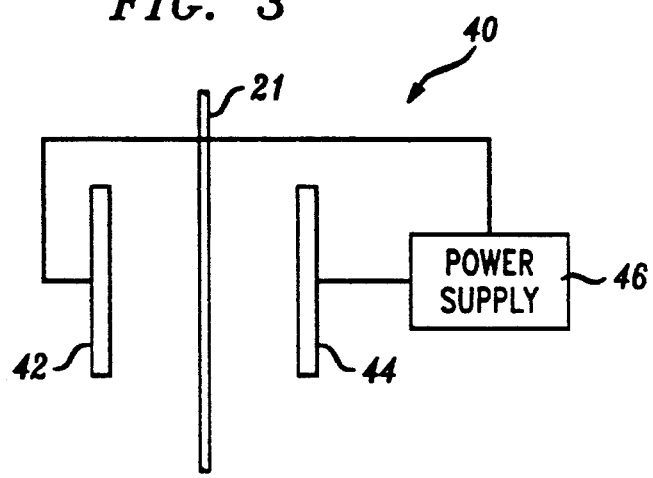
FIG. 3 depicts a portion of the manufacturing line of FIG. 1 for subjecting the drawn fiber to a magnetic field.

The draw line depicted in FIG. 1 includes provisions for exposing the drawn optical fiber 21 to a magnetic field. Interposed between the furnace 23 and the device 24 is an electromagnet 40. The electromagnetic 40 may be in the form of two parallel plates or an electrified coil. Shown in FIG. 3 is an arrangement 40 which includes two parallel plates 42 and 44 which are connected to a power supply 46 to establish a magnetic field between the plates. The drawn optical fiber 21 is advanced between the plates whereupon the magnetic field alters the electron spin alignment of free radicals formed from the high temperature exposure during drawing. This eliminates or reduces the number of free radical defect sites present in the drawn fiber and thereby reduces the transmission loss.

In a preferred embodiment of the present invention, a magnetic field having a strength of at least about 2 kilo Gauss may be used to provide adequate electron spin alignment of free radicals formed during drawing of optical fiber. For drawing speeds presently used in the industry, a 2 kilo Gauss field has been determined to be appropriate. However, it is understood within the scope of the present invention that higher magnetic field strengths may be utilized as optical fiber draw speeds increase.

Figure 4:
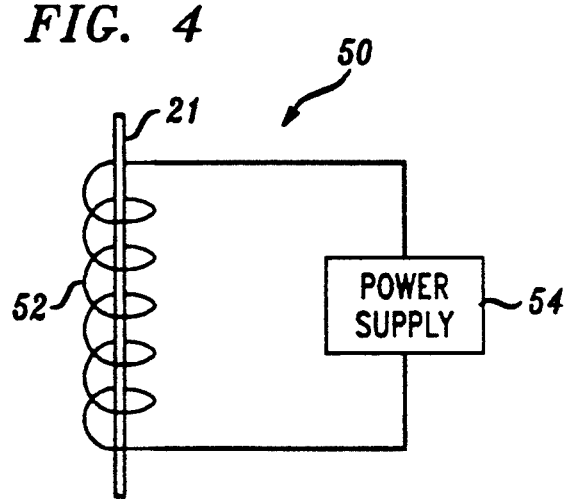
FIG. 4 depicts an alternate embodiment of the portion of the manufacturing line which subjects the drawn optical fiber to a magnetic field.

An alternate embodiment is shown in FIG. 4 in an arrangement 50 which includes a coil 52. Each end of the coil 52 is connected to a power supply 54. Drawn optical fiber is advanced through a magnetic field established by the coil 52.

It is to be understood that the above-described arrangements are simply illustrative of the invention. Other arrangements may be devised by those skilled in the art which will embody the principles of the invention and fall within the spirit and scope thereof.

I claim:

1. A method of making an optical fiber which has a relatively low absorption loss, said method comprising the steps of:
   exposing successive increments of length of a preform to heat energy which is sufficient to allow optical fiber to be drawn from the successive increments of length;
   drawing optical fiber from successive increments of length which are subjected to heat energy; and
   exposing the drawn fiber to a magnetic field to remove defect sites, wherein the strength of the magnetic field is sufficient to reduce transmission loss by causing a reduction in the number of free radicals present in the drawn fiber.

2. The method of claim 1, wherein the optical fiber is provided with at least one layer of a coating material and wherein said step of exposing is carried out prior to the application of coating material to the drawn fiber.

3. The method of claim 2, wherein said magnetic field has a strength of at least about 2 kilo Gauss.

4. The method of claim 3, wherein said magnetic field is provided by a permanent magnet.

5. The method of claim 3, wherein said magnetic field is provided by an electromagnet.

6. An apparatus for making an optical fiber which has a relatively low absorption loss, said apparatus including:
   means for exposing successive increments of length of an optical preform to heat energy which is sufficient to allow optical fiber to be drawn from the successive increments of length;

means for drawing optical fiber from successive increments of length which are subjected to heat energy; and magnetic means past which said optical fiber is advanced for removing defect sites, wherein the strength of the magnetic field of said magnetic means is sufficient to reduce transmission loss by causing a reduction in the number of free radicals present in the drawn fiber.

7. The apparatus of claim 6, wherein said apparatus further includes means for applying at least one layer of coating material to the drawn fiber after the drawn fiber has been exposed to said magnetic means.

8. The apparatus of claim 7, wherein said magnetic means provides a magnetic field having a strength of at least about 2 kilo Gauss.

9. The apparatus of claim 8, wherein said magnetic means comprises an electromagnet.

10. The apparatus of claim 8, wherein said magnetic means comprises a permanent magnet.

11. The apparatus of claim 8, wherein said magnetic means comprises a coil through which successive increments of the drawn fiber are advanced.

12. The apparatus of claim 8, wherein said magnetic means comprises two parallel plates between which the successive increments of length of the drawn fiber are advanced.

* * * * *